United States Patent
Hobbs

(10) Patent No.: US 8,341,624 B1
(45) Date of Patent: Dec. 25, 2012

(54) SCHEDULING A VIRTUAL MACHINE RESOURCE BASED ON QUALITY PREDICTION OF ENCODED TRANSMISSION OF IMAGES GENERATED BY THE VIRTUAL MACHINE

(75) Inventor: David Victor Hobbs, Surrey (CA)

(73) Assignee: Teradici Corporation, Burnaby (CA)

( * ) Notice: Subject to any disclaimer, the term of this patent is extended or adjusted under 35 U.S.C. 154(b) by 1017 days.

(21) Appl. No.: 11/904,879

(22) Filed: Sep. 28, 2007

Related U.S. Application Data

(60) Provisional application No. 60/827,382, filed on Sep. 28, 2006.

(51) Int. Cl.
G06F 9/455 (2006.01)
G06F 9/46 (2006.01)
G06F 15/16 (2006.01)
G06F 15/173 (2006.01)
G06F 15/177 (2006.01)

(52) U.S. Cl. ............ 718/1; 718/104; 709/204; 709/231; 709/226; 715/735

(58) Field of Classification Search .................. None
See application file for complete search history.

(56) References Cited

U.S. PATENT DOCUMENTS

| | | | |
|---|---|---|---|
| 5,742,745 A | 4/1998 | Sugikawa et al. | |
| 5,883,670 A | 3/1999 | Sporer et al. | |
| 6,535,238 B1 * | 3/2003 | Kressin | 348/14.01 |
| 6,934,945 B1 | 8/2005 | Ogilvy | |
| 7,024,045 B2 * | 4/2006 | McIntyre | 382/239 |
| 7,191,440 B2 | 3/2007 | Cota-Robles et al. | |
| 7,559,078 B2 * | 7/2009 | Zhang et al. | 725/95 |
| 7,650,603 B2 * | 1/2010 | Green | 718/104 |
| 7,676,578 B1 * | 3/2010 | Zhu et al. | 709/226 |
| 2002/0143842 A1 | 10/2002 | Cota-Robles et al. | |
| 2003/0033441 A1 | 2/2003 | Forin et al. | |
| 2003/0208340 A1 | 11/2003 | Dorough | |
| 2004/0015597 A1 | 1/2004 | Thornton | |
| 2004/0143664 A1 * | 7/2004 | Usa et al. | 709/226 |
| 2004/0212730 A1 | 10/2004 | MacInnis et al. | |
| 2004/0222941 A1 | 11/2004 | Wong et al. | |
| 2004/0225744 A1 * | 11/2004 | Frossard et al. | 709/231 |
| 2005/0060421 A1 | 3/2005 | Musunuri et al. | |
| 2005/0108712 A1 * | 5/2005 | Goyal | 718/100 |
| 2005/0114395 A1 * | 5/2005 | Muralidharan | 707/104.1 |
| 2005/0240685 A1 | 10/2005 | Keys | |
| 2006/0069458 A1 | 3/2006 | Lee et al. | |
| 2006/0089992 A1 | 4/2006 | Blaho | |
| 2006/0123166 A1 | 6/2006 | Toebes et al. | |
| 2006/0282855 A1 | 12/2006 | Margulis | |

(Continued)

OTHER PUBLICATIONS

U.S. Appl. No. 60/827,391, filed Sep. 28, 2006.

(Continued)

Primary Examiner — Meng An
Assistant Examiner — Bing Zhao
(74) Attorney, Agent, or Firm — Moser Taboada

(57) ABSTRACT

A method and apparatus for scheduling a resource used by a virtual machine. In one embodiment, the method comprises generating information regarding utilization of a resource by a virtual machine, where the resource is used by the virtual machine to generate a media stream for communication with a remote computer, where information comprises a quality prediction for encoding the media stream and adjusting an allocation of the resource for use by the virtual machine based on the information.

14 Claims, 9 Drawing Sheets

U.S. PATENT DOCUMENTS

2007/0124474 A1* 5/2007 Margulis .................. 709/226
2007/0209035 A1 9/2007 Sonderegger et al.
2008/0037656 A1 2/2008 Hannuksela
2009/0024746 A1 1/2009 Welch

OTHER PUBLICATIONS

U.S. Appl. No. 11/133,955, filed Jan. 17, 2006.
U.S. Appl. No. 11/532,865, filed Sep. 18, 2006.
U.S. Appl. No. 11/549,055, filed Oct. 12, 2006.
U.S. Appl. No. 11/613,981, filed Dec. 20, 2006.
U.S. Appl. No. 11/694,756, filed Mar. 30, 2007.
"VMware Workload Management with AppSense Performance Manager," Whitepaper, AppSense Ltd., 3200 Daresbury Park, Daresbury, Warrington, WA44BU, United Kingdom, No publication date listed. Downloaded from web site www.appsense.com/files/documentation/AppSense_White_Paper_VMware_UK.pdf on Feb. 6, 2008.
AppSense Performance Manager Datasheet v1.1, 2005.
Isovic, Damir and Fohler, Gerhard, "Quality aware MPEG-2 Stream Adaptation in Resource Constrained Systems," Department of Computer Engineering, Malardalen University, Vasteras, Sweden; downloaded from web site www.mrtc.mdh.se/publications/0679.pdf on Feb. 6, 2008.
Lubonski, Marcin et al.,"An Adaptation Architecture to Improve User-Perceived QoS of Multimedia Services for Enterprise Remote Desktop Protocols," University of Technology, Sydney, Australia Downloaded from web site www.utsydney.cn/www-staffit/~simmonds/Papers/NGI05_Marcin.pdf on Feb. 6, 2008.
Domjan, Hans and Gross, Thomas R., "Extending a Best-Effort Operating System to Provide QoS Processor Management," Departement Informatik ETH Zurich. Downloaded from web site people.inf.ethz.ch/domjan/doc/iwqos.pdf on Feb. 6, 2008.
Hansen, Jacob Gorm, "Blink: 3D Display Multiplexing for Virtualized Applications," Department of Computer Science, University of Copenhagen, Denmark. Downloaded from web site www.diku.dk/~jacobg/pubs/blink-techreport.pdf on Feb. 6, 2008.
Hirofuchi, Takahiro et al., "USB/IP—a Peripheral Bus Extension for Device Sharing over IP Network," Nara Institute of Science and Technology, USENIX 2005 Annual Technical Conference, FREENIX Track, pp. 47-60. Anaheim, California, Apr. 10, 2005.
"White Paper—The Business of N-Port Virtualization," Emulex Corporation, 3333 Susan Street, Costa Mesa, CA 92626, Sep. 2005. Downloaded from web site www.virtual.com/whitepapers/Emulex_The_Business.pdf on Feb. 6, 2008.
Office Action mailed Aug. 5, 2009, for co-pending U.S. Appl. No. 11/287,128, entitled "Methods and Apparatus for Enabling Multiple Remote Displays", David V. Hobbs, filed Mar. 30, 2006, 32 pages.
Final Office Action mailed Apr. 1, 2010, for co-pending U.S. Appl. No. 11/287,128, entitled "Methods and Apparatus for Enabling Multiple Remote Displays", David V. Hobbs, filed Mar. 30, 2006, 36 pages.
Final Office Action dated Dec. 28, 2010 for U.S. Appl. No. 11/613,981 entitled "Methods and Apparatus for Communications Between a Virtualized Host and Remote Devices", 25 pages.
Office Action mailed Jun. 21, 2011, for U.S. Appl. No. 11/864,637, entitled "Apparatus and Method for Managing Virtualized Device Traffic", David V. Hobbs, filed Sep. 28, 2007, 18 pages.
USB/IP: "A Transparent Device Sharing Technology Over IP Network", Takahiro Hirofuchi et al., Nara Institute of Science and Technology, pp. 1-12, no date.

* cited by examiner

SCHEDULING A VIRTUAL MACHINE RESOURCE BASED ON QUALITY PREDICTION OF ENCODED TRANSMISSION OF IMAGES GENERATED BY THE VIRTUAL MACHINE

CROSS-REFERENCE TO RELATED APPLICATIONS

This application claims benefit of U.S. provisional patent application Ser. No. 60/827,382, filed Sep. 28, 2006, entitled "Methods and Apparatus for Improved User Interface Performance of a Multi-User Server Based Computing Platform", which is herein incorporated by reference.

BACKGROUND OF THE INVENTION

1. Field of the Invention

Embodiments of the present invention generally relate to virtualization in a remote computing system. Particularly, a method and apparatus for scheduling a resource of a virtual machine used within a remote computing system.

2. Description of the Related Art

People utilize various computing environments (e.g., MICROSOFT WINDOWS XP, APPLE MACINTOSH, REDHAT LINUX, and the like). Traditionally, a host computer could only operate one computing environment (e.g., an operating system supporting application software and device drivers).

In remote computing, a Graphical User Interface (GUI) is generated at the host computer and transmitted to a remote computer local to a user. The remote computer may be a "thin" client having only the hardware necessary to connect to and display a media stream at the local computer as well as accept input commands that are then transmitted across the network to a host computer.

Virtualization enables creation of multiple computing environments on a single host computer. Hence, one host computer supports numerous and/or different computing environments for various applications or users (e.g., remote users). Virtualization may be accomplished by a virtualization manager (Hypervisor) and one or more virtual machines, each comprising an operating system and application software resident on the host computer.

Each guest operating system has access to numerous resources of the host computer such as a Central Processing Unit (CPU), a Graphics Processing Unit (GPU), a memory or a network interface. Multiple virtual machines on one host computer tax the resources because they must be shared amongst all of the virtual machines. Accordingly, one virtual machine has to wait until a particular resource is available, which causes latency at the remote computer coupled to the virtual machine. Frequently, several virtual machines may be in a queue for the particular resource. As such, each virtual machine in that queue will be delayed.

Each remote computer in the queue will experience delays (e.g., response to peripheral device commands, accessing and storing data, updated display image representing the desktop and the like). Conventional resource scheduling does not account for quality demands at each remote computer. Hence, prioritization and allocation of common resources (e.g., CPU or GPU processing time) is not optimized for virtualized computing environments.

Therefore, there is need in the art for improved virtualized support for remote computing.

SUMMARY OF THE INVENTION

Embodiments of the present invention, generally, relate to a method and apparatus for scheduling a resource used by a virtual machine. In one embodiment, the method for scheduling a resource used by a virtual machine comprises the steps of generating information regarding utilization of a resource by a virtual machine, wherein the resource is used by the virtual machine to generate a media stream for communication with a remote computer, wherein the information comprises a quality prediction for encoding the media stream and adjusting an allocation of the resource for use by the virtual machine based on the information.

In another embodiment, the apparatus for allocating resources for one or more virtual machines comprises a resource used by at least one virtual machine to generate a media stream, an analyzer for generating information regarding utilization of the resource by the at least one virtual machine to generate the media stream, wherein the information comprises a quality prediction used for encoding the media stream and a resource manager for adjusting an allocation of the resource for use by the at least one virtual machine based on information.

In yet another embodiment, the system for allocating resources for one or more virtual machines comprises one or more virtual machines for generating a media stream for communication to at least one remote computer, an analyzer for generating information regarding utilization of a resource to generate the media stream by the at least one virtual machine, wherein the information comprises a quality prediction relating to encoding of the media stream and a virtualization manager, coupled to the at least one virtual machine, for adjusting an allocation of the resource based on the information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
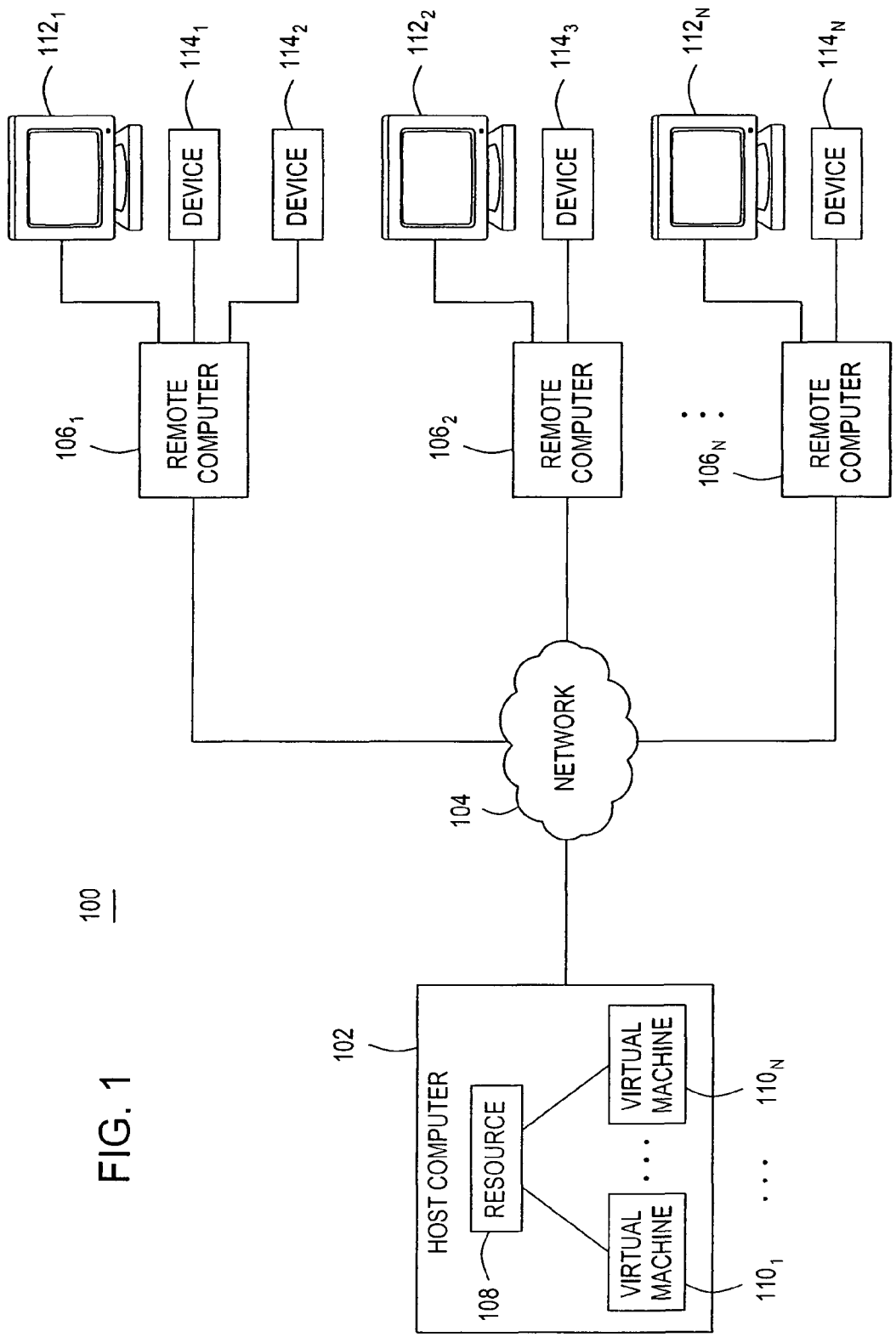
FIG. 1 is a block diagram of an exemplary embodiment of a system in accordance with one or more embodiments of the present invention.

FIG. 1 is a block diagram of an exemplary embodiment of a system 100 in accordance with one or more embodiments of the present invention. Generally, the system 100 is a networked computer system having one or more hosts serving one or more remote computers. The system 100 comprises a host computer 102, and a plurality of remote computers 106, each coupled through a network 104.

The host computer 102 includes a resource 108 and the virtual machines 110 (illustrated as a virtual machine $110_1$ . . . a virtual machine $110_N$). The resource 108 may be a network resource such as a shared network interface resource, a central processing unit resource, a graphics processor resource, a memory resource, a file system resource or the like. The virtual machines 110 use the resource for performing operations on various data (e.g., video data, image data, textual data, audio data, display data, peripheral device data and the like). In one embodiment, the system 100 includes a plurality of resources 108, which are allocated and shared amongst the virtual machines 110.

The network 104 comprises a communication system (e.g., the Internet, LAN, WAN, and the like) that connects computer system completely by wire, cable, fiber optic, and/or wireless links facilitated by various types of well-known network elements, such as hubs, switches, routers, and the like. In one embodiment the network 104 employs various well-known protocols (e.g., TCP/IP and the like) to communicate information amongst the network resources. For example, the network 104 employs part of the Internet.

The plurality of remote computers 106 is illustrated as a remote computer $106_1$, a remote computer $106_2$ . . . a remote computer $106_N$. Each remote computer of the plurality of remote computers 106 includes a display 112 and one or more devices 114. The display 112 (illustrated as a display $112_1$, a display $112_2$ . . . a display $112_N$) is any device capable of displaying an image (e.g., a monitor and the like). In some embodiments, the remote computer 106 connects to a plurality of displays, for example using multiple separate display connections such as Digital Visual Interface (DVI) or a multiplexed display connection such as DisplayPort. The devices 114 (illustrated as a device $114_1$, a device $114_2$ . . . a device $114_N$) are peripheral devices customarily used by the plurality of remote computers 106 and the host computer 102 for input and output (e.g., a mouse, a keyboard, a printer, a scanner and the like).

Within the system 100, the resource 108 is shared by the virtual machines 110 to generate a media stream (e.g., a video stream, an audio stream, display data and the like) for communication with one of the plurality of remote computers 106. In one embodiment, each of the virtual machines 110 creates one computing environment for each corresponding one of the plurality of remote computers 106. In another embodiment, the media stream generated and/or encoded using the resource 108 of the one of the virtual machines 110 includes an image representing a remote desktop of a user of the corresponding one of the plurality of remote computers 106. The user may use any of the devices 114 to manipulate data and perform tasks on the remote desktop enabled through the one of the virtual machines 110. As described below, the resource 108 is scheduled in order to control and optimize a quality of the encoded media stream.

Figure 2:
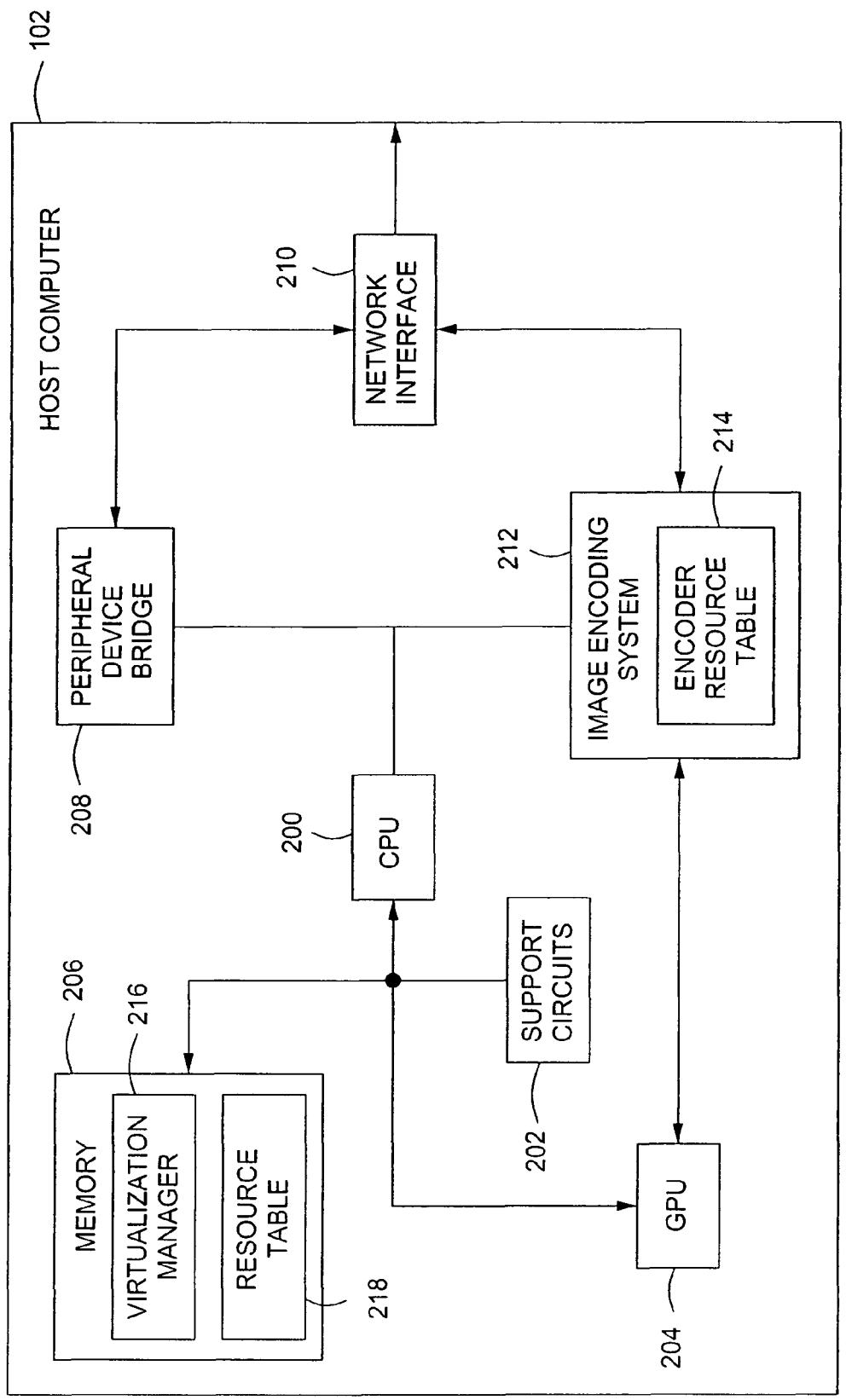
FIG. 2 is a block diagram of an exemplary embodiment of a host computer in accordance with one or more embodiments of the present invention.

FIG. 2 is a block diagram of an exemplary embodiment of the host computer 102 in accordance with one or more embodiments of the present invention. The host computer 102 includes a central processing unit (CPU) 200, various support circuits 202, a graphics processing unit (GPU) 204, a memory 206, a peripheral device bridge 208, a network interface 210, and an image encoding system 212.

The CPU 200 is any microprocessor or microcontroller known in the art and generally facilitates Input/Output processing, application software, drivers, display creation and virtualization management. The support circuits 202 may include cache, local buses, interconnect chip set, power supplies, clock circuits, data registers, I/O interfaces, and the like. The support circuits 202 support the functionality of the CPU 200, the GPU 204 or another processor in the host computer 102.

In one embodiment, the GPU 204 is a dedicated graphics rendering device usually coupled to a motherboard of a computer including the CPU 200. It is well understood in the art that the descriptive term "dedicated" means the device has its own memory and, therefore, may not use the memory 206. Alternatively, the GPU 204 is emulated using a set of processor-executable instructions stored in the memory 206. According to one embodiment, the GPU 204 comprises graphics processing resources and cooperates with a drawing memory for generating a media stream using virtualized graphic processing methods. In another embodiment, the GPU 204 comprises one or more graphics pipeline resources, suitably partitioned to support processing of multiple concurrent media streams. In another embodiment, the GPU 204 comprises multiple instances of 2D or 3D graphics processing engines. The GPU 204 implements a number of graphics primitive operations in a way that enables running them much faster than rendering an image directly to the screen with the CPU 200. The GPU 204 may cooperate with the CPU 200, the memory 206, and other components of the host computer 102 to facilitate efficient image rendering and media stream generation.

The memory 206 is coupled to the CPU 200 through one or more data paths. The memory 206 is sometimes referred to as main memory and may be used as cache memory or buffer memory. The memory 206 may comprise random access memory, read only memory, removable disk memory, flash memory, and various combinations of these types of memory. The memory 206 stores various drivers, routines, libraries, operating systems, applications and other software used by the CPU 200. In one embodiment, the memory 206 stores various software packages including a virtualization manager 216 and an analyzer 220. The memory 206 also stores various data including a resource table 218.

The peripheral device bridge 208 manages the transfer of peripheral device data (e.g., audio, printer, keyboard, mouse, Human Input Device (HID), real-time I/O or other device data related to the devices 114 transported between the host computer 102 and the plurality of remote computers 106 as illustrated in FIG. 1). In one embodiment, the peripheral device bridge 208 may be an independent logic circuit, such as a Application Specific Integrated Circuit (ASIC) or Field Programmable Gate Array (FPGA).

The network interface 210 communicates the encoded media stream for display at a remote computer having the plurality of remote computers 106 and device-related data structures such as audio packets, USB Request Blocks (URBs) or other device data between the host computer 102 and any of the plurality of remote computers 106. In one embodiment, the network interface 210 provides compatibility with the network 104 by executing a reliable protocol stack such as TCP/IP. In addition to supporting client-related data, the network interface 210 provides information relating to network components such as network capacity, availability information or queue fill levels associated with the network interface 210. In one or more embodiments, the network interface 210 is coupled with the CPU 200, the memory 206, an image encoding system 212 or the peripheral device bridge 208.

The image encoding system 212 includes an encoder resource table 214, which stores network bandwidth information and quality information (e.g., a quality target, a quality prediction and the like) used for generating (e.g., shaping, encoding, rendering, and the like) of a media stream (e.g., display data), which may be affected by factors such as a network bandwidth capacity and a user profile. The image encoding system 212 may be a component within the GPU 204.

Generally, the image encoding system 212 is a multi-stream image encoder that uses various encoding techniques (e.g., transformation) to encode a media stream from the GPU 204 or the CPU 200. In one or more embodiments, the media stream comprises a stream of image frames or pixel updates generated by the GPU 204 or the CPU 200. In one embodiment, the media stream includes one or more video commands associated with the stream of image frames or pixel updates generated by the GPU 204 or the CPU 200.

Generally, the virtualization manager 216 monitors the virtual machines 110. A scheduler for the virtualization manager 216 may be referred to as a resource manager. Alternatively, the virtualization manager is known as a HYPERVISOR. In one or more embodiments, the virtualization manager 216 controls the interaction of the virtualized machines and various hardware components (i.e., resources), such as the CPU 200, the GPU 204, other local processors and/or the memory 206 including memory allocation, file system access priority and the like. In effect, the virtualization manager 216 isolates the virtual machines 110 from each other. In one embodiment, the virtualization manager 216 comprises a set of processor-executable instructions in the memory 206 for adjusting an allocation of a resource (e.g., the resource 108 as illustrated in FIG. 1). The resource table 218 comprises scheduling information for managing allocation of the resource for utilization by the virtual machines 110. The scheduling information of the resource table 218 represents one or more adjustments to allocations of the resources made by the virtualization manager 216. Alternatively, the image encoding system 212 may be a set of processor-executable instructions stored in the memory 206.

Figure 5:
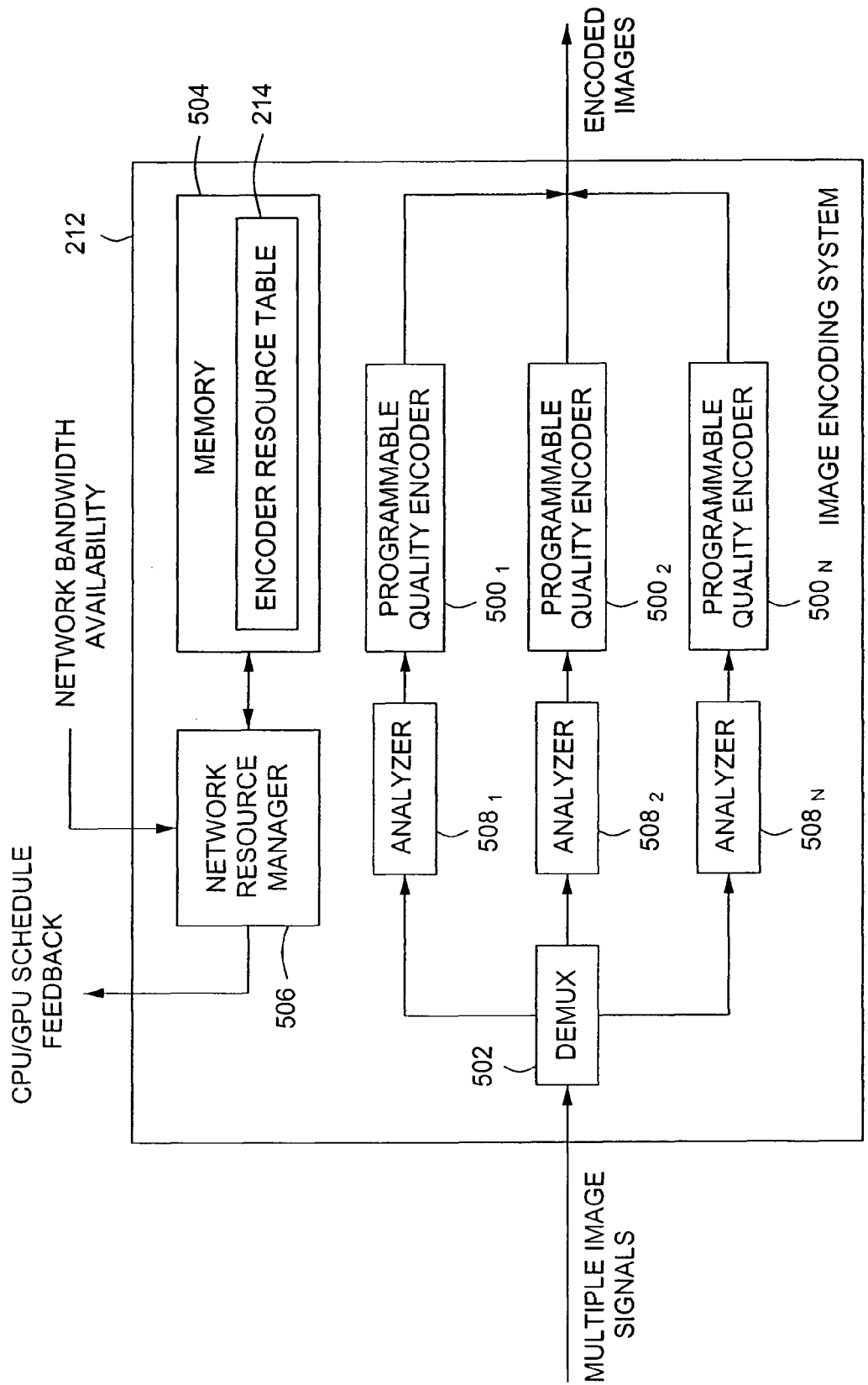
FIG. 5 is block diagram of an exemplary embodiment of an image encoding system in accordance with one or more embodiments of the present invention.

In operation, one or more virtual machines use a plurality of resources coupled to the host computer 102 in accordance with the scheduling information within the resource table 218 to generate one or more media streams for communication with one or more remote computers. Then, information is generated by an analyzer (e.g., an analyzer 508 as illustrated in FIG. 5) regarding utilization of the plurality of resources by one or more virtual machines. In one embodiment, the image encoding system 212 encodes the media stream and/or the analyzer generates a portion of the information (e.g., quality information pertaining to encoding the media stream, such as a quality prediction or a comparison result between the quality prediction and a quality target). Based on the information, a scheduler executed by the virtualization manager 216 adjusts one or more allocations of the plurality of resources. In accordance with one or more embodiments of the present invention, the resource table 218 is modified to reflect the one or more adjusted allocations of the plurality of resources. Accordingly, one or more virtual machines share the plurality of resources in accordance with the modified resource table 218.

According to one embodiment, the one or more virtual machines share usage of the plurality of resources to generate display data for communication with one or more remote computers. The image encoding system 212 encodes the display data and generates a quality prediction for the encoded display data (e.g., using one or more analyzers 508 of FIG. 5). Then, in one embodiment, the virtualization manager 216 allocates the plurality of resources amongst the plurality of virtual machines in order to regulate communication of the future display data associated with each virtual machine to the one or more programmable quality encoders (e.g., programmable quality encoders 500 of FIG. 5) based on the quality prediction. Accordingly, the quality of the encoded display data is managed using optimized resource scheduling determined by the virtualization manager 216 and the image encoding system 212.

Figure 3:
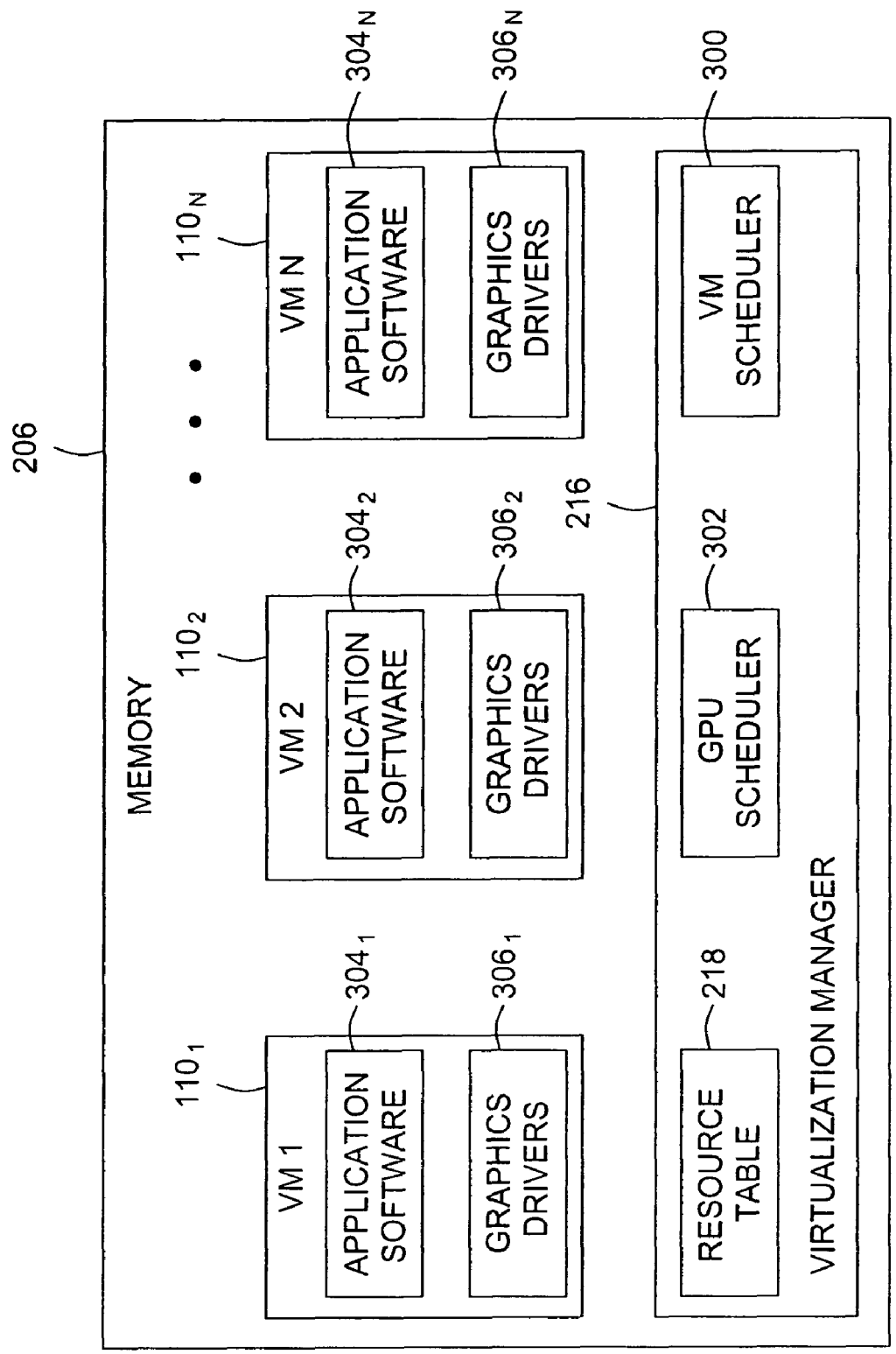
FIG. 3 is a block diagram representing an exemplary embodiment of various software stored in a memory of the host computer in accordance with one or more embodiments of the present invention.

FIG. 3 is a block diagram representing an exemplary embodiment of various software stored in the memory 206 of the host computer 102 in accordance with one or more embodiments of the present invention.

Each of the virtual machines 110 comprises application software 304 (i.e., illustrated as application software $304_1$, application software $304_2$ . . . application software $304_N$) and graphics drivers 306 (i.e., illustrated as graphics drivers $306_1$, graphics drivers $306_2$ . . . graphics drivers $306_N$), typically under the control of an operating system such as MICROSOFT WINDOWS, LINUX, UNIX or the like. The application software 304 comprises a plurality of software packages for performing various tasks (e.g., word processing software, database software, messaging software, and the like). The graphics drivers 306 comprise a plurality of software packages that enable an operating system of the host computer 102 to operate a graphics processor (e.g., the GPU 204). Examples of graphics drivers 306 include VGA, AMD, DirectX, OpenGL and the like.

In one embodiment, the graphics drivers 306 emulate one or more functions of a GPU (e.g., the GPU 204 as illustrated in FIG. 2), such as VGA, 2-D and/or 3-D drawing operations. Images rendered using the graphics drivers 306 are written to the image buffers associated with virtualization manager 216. Then, the rendered images are encoded by an image encoding system (e.g., the image encoding system 212 as illustrated in FIG. 2) and transmitted to a remote computer (e.g., any of the remote computers 106). In another embodiment, the graphics drivers 306 offload drawing operations associated with the GPU 204. For example, drawing commands are communicated to the GPU 204 for execution. In such an embodiment, images are rendered locally to image buffers associated with the GPU 204 and/or image encoding system 212 prior to encoding and transmittance to the remote computer. In another embodiment, images are rendered at the remote computer.

The virtualization manager 216 also includes other drivers such as Plug and Play (PnP) manager and device drivers associated with one or more peripheral devices located at the remote computer. The device drivers typically include a human interface device (HID) driver to support termination of mouse and keyboard in addition to a selection of other device drivers (alternatively referenced as class drivers) such as mass storage, audio, video, printer, serial or other device drivers for the supported peripheral devices. In an exemplary embodiment, the device drivers include one or more USB device drivers for the devices 114 as illustrated in FIG. 1. Device data is exchanged between the devices coupled to the remote computer and the host computer using a virtual controller driver in the virtualization manager 216.

In one embodiment, URBs and responses related to the virtual machines 110 are prioritized and managed by a peripheral device bridge (e.g., the peripheral device bridge 208 in FIG. 2). In another embodiment, each virtual machine of the virtual machines 110 manages its own URBs and responses. In addition, the virtual machines 110 directly communicate with their associated remote computer using a network interface (e.g., the network interface 210 as illustrated in FIG. 2).

As described above, the virtualization manager 216 isolates VM $110_1$, VM $110_2$ . . . VM $110_N$. Examples of commercially available virtualization management products include VMWARE ESX SERVER from EMC CORPORATION, XENSERVER from XENSOURCE™ or MICROSOFT VIRTUAL SERVER or VIRIDIAN from MICROSOFT CORPORATION. The virtualization manager 216 schedules CPU processing time and/or other resources. In one embodiment, the virtualization manager 216 allocates storage bandwidth and network bandwidth. In one embodiment, an address management function of virtualization manager 216 enables PnP initialization by providing virtualized PCI address spaces to virtual controller drivers within the virtual machines 110. The virtualization manager 216 also manages translation of URBs, interrupts, control data such as transfer status signals and DMA control signals between the virtual address spaces used by drivers and the physical address space used by the GPU, an image encoding system (e.g., the image encoding system 212) and a peripheral device bridge (e.g., the peripheral device bridge 208).

The virtualization manager 216 comprises the resource table 218, a virtual machine (VM) scheduler 300 and a GPU scheduler 302. The VM scheduler 300 manages, allocates and schedules resources including CPU processing time or order, memory and other priorities such as storage and network access based on a user profile, one or more interrupts, a bandwidth usage, a memory usage or any other resource usage information such as virtual machine priority indications from the image encoding system.

The virtualization manager 216 further comprises the GPU scheduler 302 that establishes graphics processing priorities such as drawing priority and proportional processing resource allocation. In an embodiment, the GPU scheduler 302 manages and allocates a GPU (e.g., the GPU 204 as illustrated in FIG. 2) by prioritizing multiple flows of graphics commands issued by the virtual machines 110, which may be dependent upon the user profile, the network bandwidth usage information or other information from the image encoding system. In an embodiment, the prioritization of the GPU is influenced by processing priority indications provided by the peripheral device bridge. For example, a virtual machine with a high level of Human Interface Device (HID) activity detected by the peripheral device bridge is assigned a higher graphics processing priority than a virtual machine with no HID activity. In one embodiment, where the GPU is emulated in software in the virtual machines 110, the GPU scheduler 302 is synchronized with VM scheduler 300 such that VM processing priority of both the CPU and the GPU resources are adjusted in tandem.

In another embodiment, the GPU scheduling information is communicated to the GPU, which in turn manages its own processing schedule in accordance with one or more embodiments accordingly. In some embodiments, the VM scheduler 300 or the GPU scheduler 302 maintain allocation history information of the resource and an encoded quality history associated with the processing schedules for sequencing. For example, a virtual machine could receive a high priority schedule in the presence of a determined input event such as a mouse click or display change, but processing resources return to nominal allocation over a sequenced period.

Figure 4:
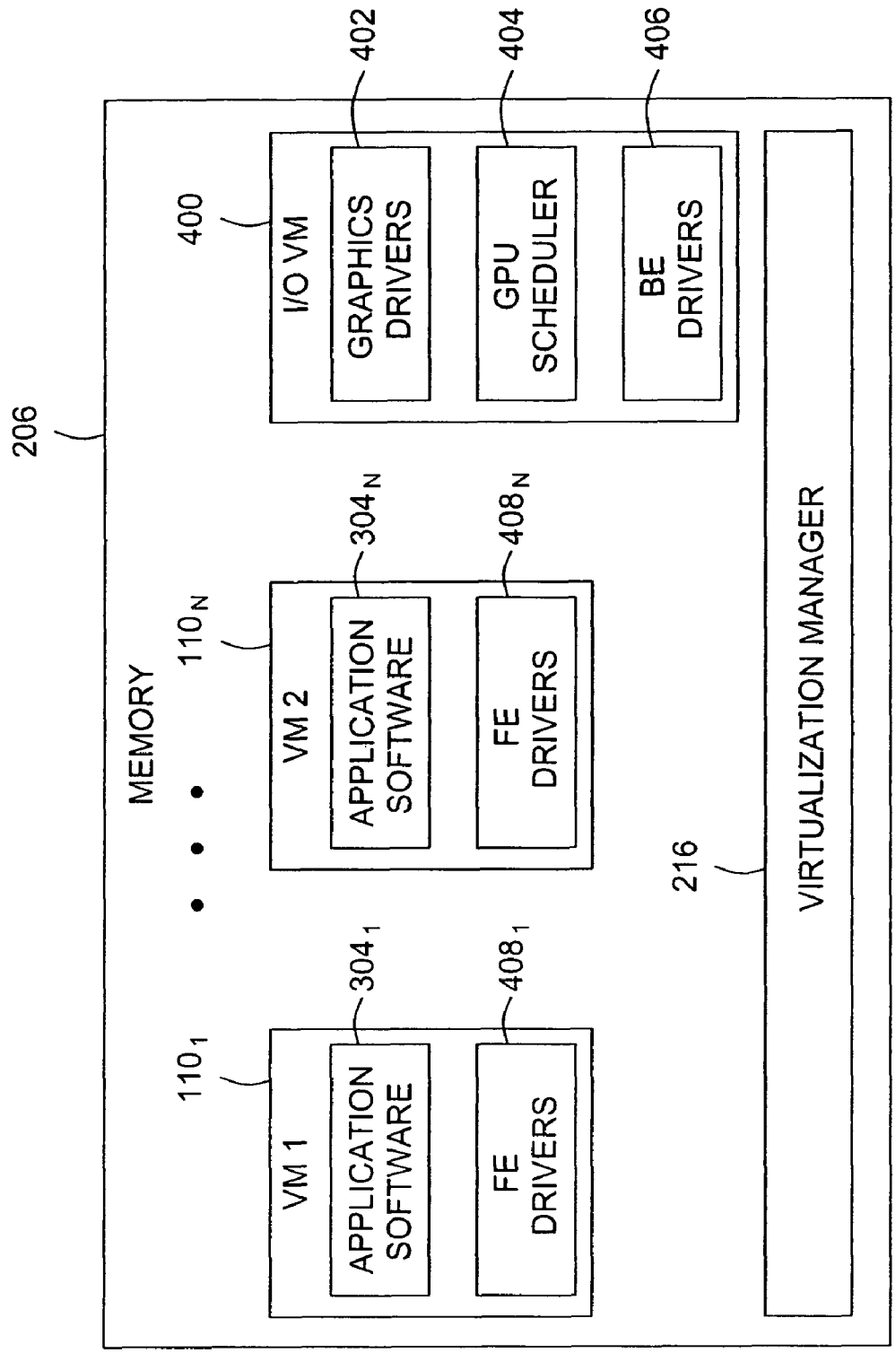
FIG. 4 is a block diagram representing another exemplary embodiment of various software stored in the memory of the host computer, having an input/output virtual machine in accordance with one or more embodiments of the present invention.

FIG. 4 is a block diagram representing another exemplary embodiment of various software stored in the memory 206 having an input/output virtual machine 400 in accordance with one or more embodiments of the present invention.

FIG. 4 illustrates a paravirtualization embodiment of the present invention. The virtual machines 110, illustrated as the VM $110_1$, the VM $110_2$ . . . the VM $110_N$, are associated with different remote computers such as a remote computer $106_1$, a remote computer $106_2$ . . . a remote computer $106_N$, as illustrated in FIG. 1. Furthermore, each of the virtual machines 110 comprises application software 304 (illustrated as application software $304_1$, application software $304_2$ . . . application software $304_N$) and front-end drivers 408 (illustrated as front-end drivers $408_1$, front-end drivers $408_2$ . . . front-end drivers $408_N$). In this embodiment, the memory 206 further comprises the input/output virtual machine (I/O VM) 400. The I/O VM 400 includes graphics drivers 402, a GPU scheduler 404, and back-end (BE) drivers 406.

The I/O VM 400 comprises the back-end (BE) drivers 406 which receive I/O commands and communicate responses and control information to the virtual machines 110. The I/O VM 400 also comprises graphics drivers 402, which are similar to the graphics drivers 306 as illustrated in FIG. 3 but better suited to supporting multiple virtual machines. The Front-End (FE) drivers 408 exchange input/output (I/O) commands with the complementary Back End (BE) drivers 406 within the I/O VM 400. The I/O VM 400 further comprises I/O drivers for devices associated with the different remote computers. In some embodiments, one or more I/O virtual machines host different drivers. For example, the I/O VM 400 supports graphics processing and another I/O VM hosts peripheral device drivers.

The I/O VM 400 also comprises the GPU scheduler 404 which manages graphics processing priorities similar to the GPU scheduler 302 as illustrated in FIG. 3. For example, the GPU scheduler 404 prioritizes a processing order of graphics commands issued by virtual machines 110, which are dependent on the user profiles for the virtual machines 110, network bandwidth utilization information, an interrupt or any other priority indicator. In a graphics emulation embodiment where the graphics drivers 402 include emulated drawing functions, the GPU scheduler 404 establishes the graphics processing order and allocates processing resources coupled to the graphics drivers 402. In one embodiment, the graphics drivers 402 offloads graphics processing to a GPU resource such as the GPU 204 in FIG. 2. The GPU scheduler 404 establishes the processing order and allocates processing resources of the GPU by managing a flow of instructions to the GPU and/or communicating a schedule to the GPU to dictate processing of one or more graphics commands.

In an embodiment where the prioritization of graphics processing is influenced by processing priority indicators provided by a peripheral device bridge such as the peripheral device bridge 208 as illustrated in FIG. 2, a virtual machine with a high level of HID activity detected by the peripheral device bridge 208 is temporarily assigned a higher graphics processing priority than a virtual machine with no HID activity. Furthermore, GPU scheduling requirements are retrieved from the peripheral device bridge 208, the image encoding system 212 and/or the VM scheduler 300.

FIG. 5 is block diagram of an exemplary embodiment of an image encoding system 212 in accordance with one or more embodiments of the present invention.

The image encoding system 212 comprises programmable quality encoders 500, a demux 502, a memory 504, a network resource manager 506 and analyzers 508. The programmable quality encoders 500 are illustrated in FIG. 5 as a programmable quality encoder 500$_1$, a programmable quality encoder 500$_2$ . . . a programmable quality encoder 500$_N$. The analyzers 508 are also illustrated in FIG. 5 as an analyzer 508$_1$, an analyzer 508$_2$ . . . an analyzer 508$_N$. The demux 502 is a device that processes a single data stream comprising multiple media streams from a plurality of virtual machines. The demux 502 selects each media stream of the multiple media streams and communicates that media stream to any of the programmable quality encoders 500.

The memory 504 is coupled to the network resource manager 506. The memory 504 is sometimes referred to as main memory and may be used as cache memory or buffer memory. The memory 504 may comprise random access memory, read only memory, removable disk memory, flash memory, and various combinations of these types of memory. The memory 504 includes the encoder resource table 214. As described above, the encoder resource table stores network bandwidth information and quality information (e.g., a quality target, a quality prediction and the like) used for generating (e.g., shaping, encoding, rendering, and the like) of a media stream (e.g., display data), which may be affected by factors such as a network bandwidth capacity and a user profile.

As mentioned above, multiple media streams from multiple virtual machines (e.g., the virtual machines 110) are received from a GPU (e.g., the GPU 204) or a CPU (e.g., the CPU 200). The multiple media streams are de-multiplexed by the demultiplexer (demux) 502 and then, communicated to the programmable quality encoders 500. For example, in one embodiment, the programmable quality encoder 500$_1$ encodes a media stream from the VM 110$_1$, the programmable quality encoder 500$_2$ encodes a media stream from the VM 110$_2$ and the programmable quality encoder 500$_N$ encodes a media stream from the VM 110$_N$. In one or more embodiments, the programmable quality encoders 500 implement substantially similar image encoding algorithms. In other embodiments, the programmable quality encoders 500 implement different encoding algorithms. For example, the different encoding algorithms may be optimized for different compression requirements, frame rates, input image types and/or media stream formats.

Each programmable quality encoder of the programmable quality encoders 500 encodes a media stream received from a virtual machine (e.g., any of the virtual machines 110) based on a quality target for the encoded media stream and an amount of available network bandwidth needed to communicate the encoded media stream to a remote computer. In one embodiment, the programmable quality encoders 500 implement Discrete Cosine Transform (DCT) or wavelet compression methods known to the art and the level of image quantization is adjusted to meet quality and bandwidth requirements. In another embodiment, progressive image transmission methods such as progressive bitplane encoding methods are used to reduce peak network bandwidth demand. An example of the programmable quality image encoder 500 is disclosed in commonly assigned U.S. patent application Ser. No. 11/532,865, entitled "Methods and Apparatus for Encoding a Digital Video Signal", filed Sep. 18, 2006, which is incorporated by reference herein in its entirety.

The network resource manager 506 determines virtualization scheduling requirements related to graphics processing using one or more resource allocation techniques. In one embodiment, the network resource manager 506 receives current network bandwidth information from the CPU 200 or the network interface 210 as illustrated in FIG. 2 and manages the encoder resource table 214 in the memory 504 to support resource allocation adjustments and calculations. According to one embodiment, the network resource manager 506 analyzes the encoder resource table 214 to determine the virtualization scheduling requirements, which are communicated to the CPU 200 and/or the GPU 204 as illustrated in FIG. 2.

The image encoding system 212 also includes analyzers 508 located ahead of the programmable quality encoders 500 in the encoding pipeline. According to one or more embodiments, each analyzer (e.g., a fixed function component) generates information regarding utilization of resources by virtual machines 110. In one embodiment, the information includes a quality prediction for encoding a media stream. In one embodiment, each analyzer includes processor-executable instructions for generating information regarding utilization of the resources by the virtual machines 110.

Table 1 presents an embodiment of the encoder resource table 214.

TABLE 1

Encoder Resource Table

| | Available Bandwidth | Target Quality | Predicted Quality | Attributes |
|---|---|---|---|---|
| Encoder 500$_1$ | B$_1$ | TQ$_1$ | PQ$_1$ | A$_1$ |
| Encoder 500$_2$ | B$_2$ | TQ$_2$ | PQ$_2$ | A$_2$ |
| Encoder 500$_N$ | B$_3$ | TQ$_3$ | PQ$_3$ | A$_3$ |

Referring to Table 1, bandwidth, quality and attribute information is maintained for encoders 500$_1$, 500$_2$ . . . 500$_N$.

In one embodiment, amounts of available network bandwidth B$_1$, B$_2$ and B$_3$ are pre-configured upper bandwidth limits (e.g. maximum Megabits/s) based on network limitations, network bandwidth allocation or a user profile. In other embodiments, available bandwidth capacities are dynamic limits based on real time network availability information, statistics provided by network monitoring software or equipment or adjusted in proportion to comparative quality targets TQ$_1$, TQ$_2$ and TQ$_3$.

Quality targets TQ$_1$, TQ$_2$ and TQ$_3$ are static or variable desired quality targets for an encoded media stream according to various factors including a user profile, a number of operational virtual machines or a workload type. In one embodiment, certain remote computers (e.g., remote computers supporting CAD interfaces) are assigned a maximum quality target while other remote computers (e.g., remote computers providing word processing interfaces) are assigned a lower quality target. The quality targets use a suitable perceptual quality metric, a numerical metric such as PSNR or a target number of bit-planes.

Quality metrics Pa$_1$, PQ$_2$ and PQ$_3$ are predicted for encoding the media stream by the analyzers 508$_1$, 508$_2$ . . . 508$_N$ and updated by programmable quality encoders 500$_1$, 500$_2$ . . . 500$_N$, respectively, to record quality predications based on an analysis of the media stream and an amount of available network bandwidth associated with a communication channel coupling the host computer with the remote computer. For example, the programmable quality encoder $500_1$ receives an image update from the GPU 204, retrieves an amount of available network bandwidth amount $B_1$ and determines a quality prediction $PQ_1$ for the resultant image update which is stored in the encoder resource table 214. According to one or more progressive encoding embodiments, the quality prediction is a quantitative image quality prediction associated with the number of bit-planes or refinement levels of the image (e.g., Discrete Wavelet Transform (DWT) coefficient refinement data) that can be transmitted to the remote computer given the amount of available network bandwidth.

Then, the programmable quality encoder $500_1$ encodes the media stream to a quality level $TQ_1$ or higher if a sufficient amount of network bandwidth is available. If network bandwidth is constrained, the predicted quality metric $PQ_1$ is lower than the quality level $TQ_1$. In one embodiment, $PQ_1$ comprises a numerical estimation of a number of frames that will be dropped from a video frame sequence in order to meet the network bandwidth constraint $B_1$. If it is determined that a number of frames dropped or the quality of an image stream deteriorated based on the network bandwidth constraints, the CPU or the GPU processing resources associated with the virtual machine are de-allocated to prevent or limit generation of future wasted frames. In another embodiment, the processing resources are de-allocated for a time period proportional to a time required to communicate the media stream to the remote computer.

Attributes $A_1$, $A_2$ and $A_3$ store attribute information useful in resource allocation. One example of an attribute includes a "Scroll Detect" flag which is established by the image encoding system 212 when an image scroll is detected. In one embodiment of a scroll-effected schedule, the CPU or the GPU processing resources associated with the virtual machine are throttled in the presence of continuous scrolling until an image has stabilized and processing resources are assigned to other virtual machines. This reduces the frame rate of the scrolled image and enables CPU and/or GPU resources to be allocated to operations associated with other virtual machines associated with a higher quality target. Other attributes include an image type (e.g., video image type), a measurement of an amount of change in an image compared to a previous frame or network statistics (e.g., one-way delay) useful in determining a duration to maintain an adjusted schedule. In some embodiments, resource allocation and scheduling is also based on other I/O activity related to the same virtual machine. As one example, if a web browser associated with a virtual machine stalls due to a slow network connection resulting in sporadic or partial image updates until the full HTML update is received, processing resources are reallocated to other virtual machines until a substantial portion of the screen update is available.

Figure 6:
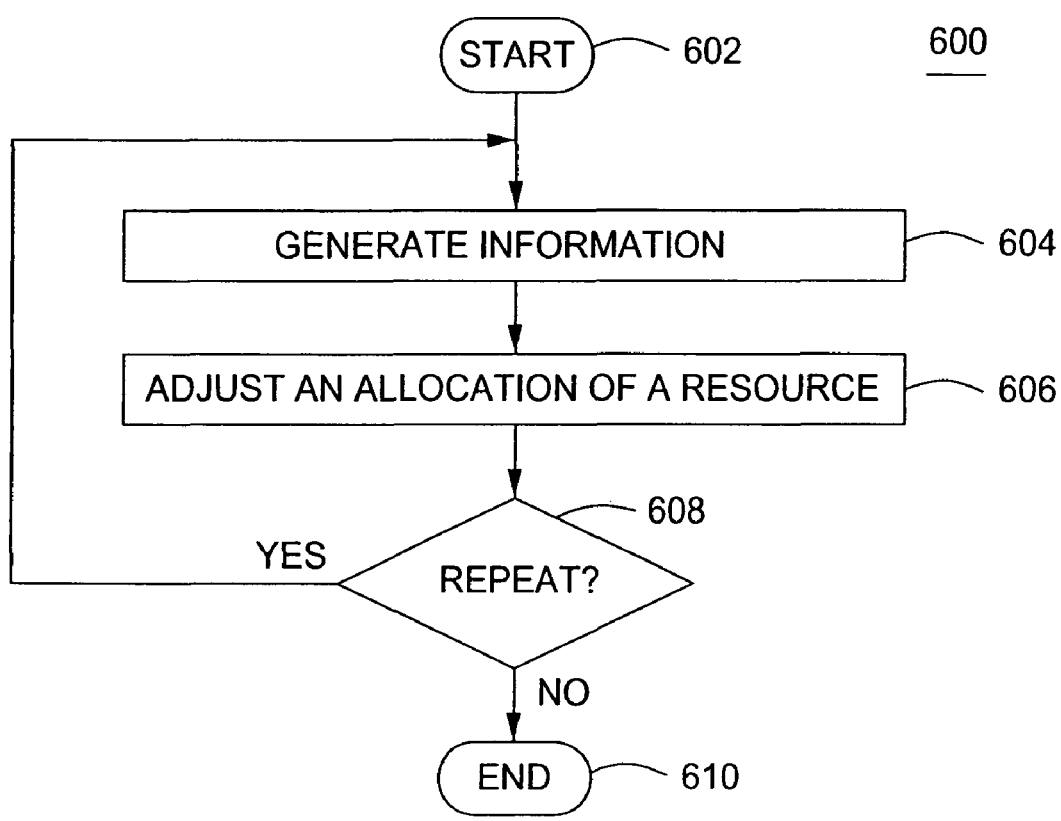
FIG. 6 is a flow diagram of an exemplary embodiment of a method of scheduling a resource of a virtual machine in accordance with one or more embodiments of the present invention.

FIG. 6 is a flow diagram of an exemplary embodiment of a method 600 of scheduling a resource of a virtual machine in accordance with one or more embodiments of the present invention.

The method 600 begins at step 602 and proceeds to step 604. At step 604, information is generated regarding utilization of the resource by the virtual machine to generate a media stream. According to one or more embodiments, the information comprises utilization information for a network bandwidth, a central processing unit and/or a graphics processor. The information further comprises content information and/or quality information for the media stream (e.g., encoded media stream). In one embodiment, the information includes a quality prediction for encoding the media stream. In another embodiment, the information is adjusted based on one or more attributes of an image frame representing a portion of the media stream. According to one or more embodiments, the media stream is encoded based on a quality target, the quality prediction or a comparison result between the quality target and the quality prediction.

At step 606, an allocation of the resource is adjusted in response to the information. During step 606, processing time of a CPU and/or a GPU is scheduled according to one embodiment. At step 608, a determination is made as to whether to update the information to adjust an allocation of the resource. If the information is to be updated, then the method 600 returns to step 604. If the information is not to be updated, then the method 600 proceeds to step 610. At step 610, the method 600 ends.

Figure 7:
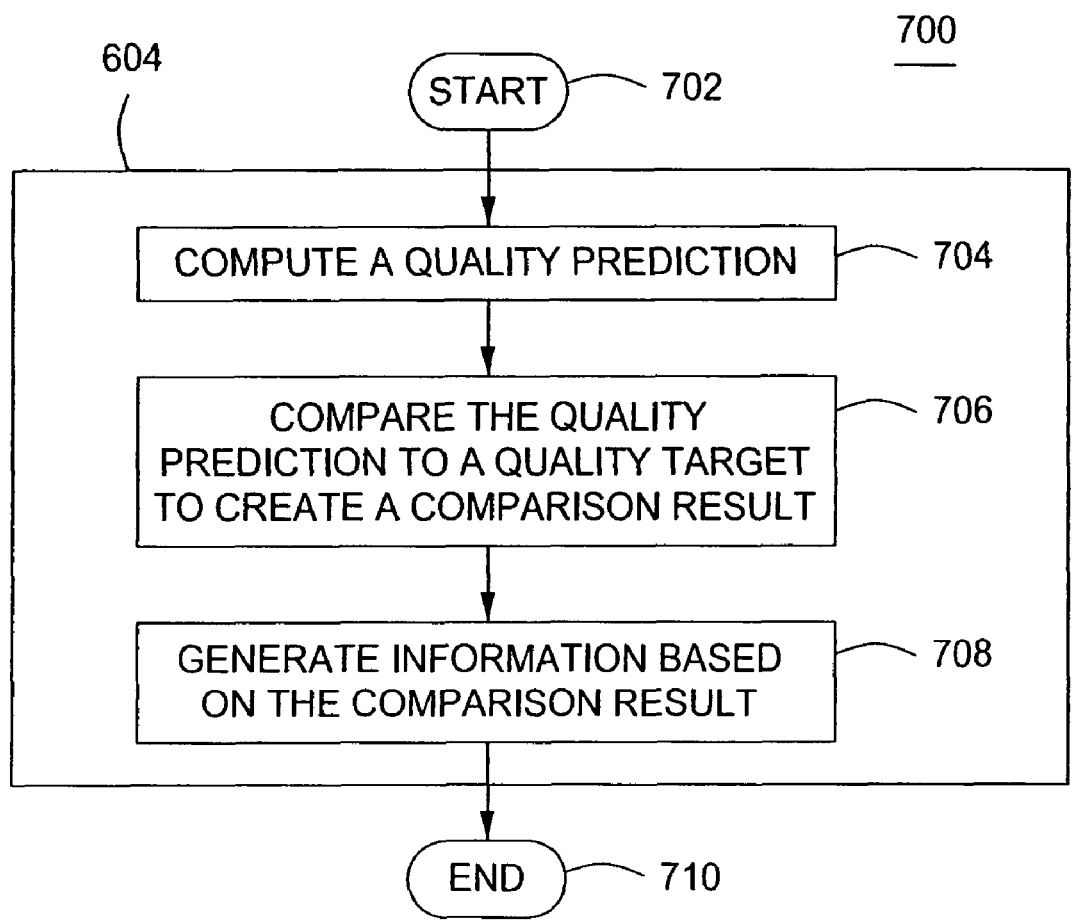
FIG. 7 is a flow diagram of an exemplary embodiment of a method of generating information regarding utilization of a resource in accordance with one or more embodiments of the present invention.

FIG. 7 is a flow diagram of an exemplary embodiment of a method 700 of generating information regarding utilization of a resource in accordance with one or more embodiments of the present invention. The method 700 includes one or more embodiments of the step 604 of the method 600 for scheduling the resource used by a virtual machine as illustrated in FIG. 6.

The method 700 begins at step 702 and proceeds to step 704. At step 704, a quality prediction for an encoded media stream is computed using various embodiments of the present invention, as described above. In one embodiment, a quality prediction for encoded display data is computed. At step 706, the quality prediction is compared to a quality target to create a comparison result. At step 708, information regarding utilization of the resource is generated based on the comparison result. At step 710, the method 700 ends.

Alternatively, the method 700 does not perform the step 708. Instead, the method 700 proceeds an embodiment of the step 606 of FIG. 6 where an allocation of the resource is adjusted based on the comparison result. The virtual machine uses the allocation of the resource to produce display data.

Figure 8:
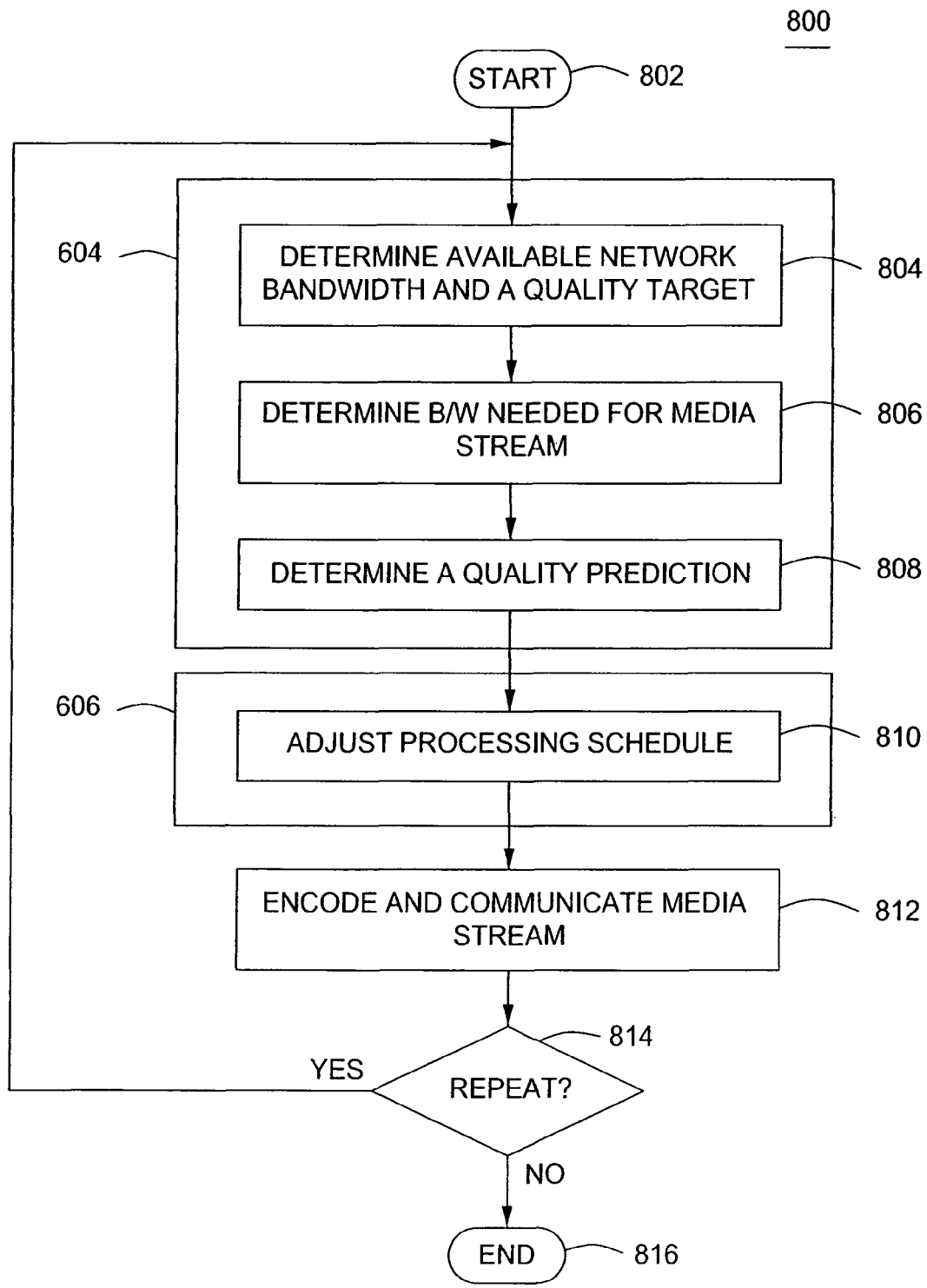
FIG. 8 is a flow diagram of an exemplary embodiment of a method of adjusting a processing schedule in accordance with one or more embodiments of the present invention.

FIG. 8 is a flow diagram of an exemplary embodiment of a method of adjusting a processing schedule as an example of resource allocation in accordance with one or more embodiments of the present invention.

The method 800 begins at step 802 and proceeds to step 804. Steps 804 to 810 depict one embodiment of step 604 as illustrated in FIG. 6. At step 804, a network bandwidth capacity and a quality target of a media stream are determined. In one embodiment, allocation of network bandwidth is statically divided between virtual machines according to one or more characteristics of a communication channel coupling a virtual machine and the remote computer, a user profile, a content type or any other communication constraint. In another embodiment, the network bandwidth allocation is adjusted in response to constraints pertaining to network access or congestion. For example, the network bandwidth allocation is adjusted according to real-time metrics, such as one-way delay measurements or error metrics provided by a network interface, remote computers or any external network monitoring device. In one embodiment, a quality target is produced in accordance with a user profile or a requirement of the virtual machine. In another embodiment, a quality target is established in response to operational requirements of the virtual machine. For example, a virtual machine executing a CAD application is granted a high quality target and a virtual machine executing a word processing or a streaming video application is granted a lower quality target.

At step 806, an amount of network bandwidth needed to communicate the media stream is determined. In one or more video or display encoding embodiments, image data (e.g., an image data stream) is received from a CPU. The image data is analyzed to determine the amount of network bandwidth required for communicating the image data to a remote computer. In one or more audio encoding embodiments, audio data (e.g., an audio data stream) is received from the CPU. The audio data is analyzed to determine the amount of network bandwidth required for communicating the audio data to a remote computer. The CPU is flagged in the case of a network bandwidth prediction exceeding the available network bandwidth.

At step 808, a quality prediction for encoding the media stream is determined. In one embodiment, a quality prediction for each encoded media stream is recorded to support an analysis of a comparison between the quality target and an actual quality of each encoded media stream. The quality prediction is used because the actual quality of any of the encoded media streams may not be determined until that encoded media stream is communicated to its respective remote computer.

Within step 808, according to another embodiment, the required network bandwidth is allocated for each media stream from the virtual machines. In one image encoding embodiment, the network bandwidth is allocated according to the quality target assigned to the media stream. In another embodiment, each media stream is encoded to a level of quality that exceeds the assigned quality targets if excess resources are available (e.g., excess network bandwidth or encoding resources). The excess network bandwidth is allocated as desired (e.g., in proportion to relative target quality values for each media stream). In another embodiment, one or more media streams are encoded to a level of quality level below the assigned quality targets in case of resource limitations (e.g., depleted network bandwidth availability or limited encoding resources).

At step 810, a processing schedule is adjusted based on a difference or a comparison result between the quality prediction and the quality target of the media stream. The step 810 represents one or more embodiments of the step 606 as illustrated in FIG. 6. In one embodiment, the processing schedule associated with a CPU resource and/or a GPU resource is adjusted. In one or more embodiments, processing schedules for the CPU resources and the GPU resources are synchronized. In yet another embodiment, the processing schedules may be adjusted to reduce an allocation of the resource for the media stream (e.g., the encoded media stream) based on a quality prediction that indicates a potential failure to communicate a future media stream, (e.g., insufficient network bandwidth availability, network congestion or the like).

In one embodiment, the processing schedule is defined both by a priority of the resource (i.e. scheduling order and immediacy of context switches) and a proportional processing time allocated to the resource. In another embodiment, the resource is throttled if the quality prediction for the media stream as determined in step 808 is below the quality target as determined in the step 804.

In another embodiment, the processing schedule of the resource is prioritized in response to the availability of peripheral device data such HID information. In some embodiments, the CPU resource and/or the GPU resource allocation is adjusted based on an analysis of history information such as empirical correlation between the CPU resource allocation and a number of frames in a video image stream dropped over the same period of time. In other embodiments, the resource allocation follows a sequence based on event history. For example, the CPU resources and/or bandwidth resources for the virtual machine are prioritized following a first peripheral device event such as a mouse click associated with the remote computer. Then, the priorities are normalized when peripheral device events are received that rationally follow the first peripheral device event.

According to one embodiment, resource allocation may achieve improved latency or quality control by adjusting a CPU schedule to minimize a number of dropped frames while maintaining the quality target for the media stream. In other embodiments, resource allocation may be affected by various factors including optimal image encoding, peripheral device data, a duration requirement, a time limitation requirement, a sequencing requirement, an audio encoding resource requirement, or a requirement to synchronize with an event or other resources coupled to the virtual machine. Such factors along with the other resources determine the quality prediction of the media stream. Other resources include a storage processing requirement, memory access requirements and network bandwidth capacity requirements. In one embodiment, each of the other resources receives a proportional weighting within various embodiments of resource allocation.

At step 812, the media stream is encoded and communicated to a remote computer (e.g., any of the remote computers 106 of FIG. 1). Optionally, the media stream was encoded prior to step 812. Nonetheless, the encoded media stream is communicated to the remote computer. In one embodiment, one or more virtual machines communicate image frames or partial frame updates to an image encoding system for encoding and transmission to the remote computer. In another embodiment, a GPU communicates image frame updates from the one or more virtual machines to the image encoding system for encoding.

At step 814, a determination is made as to whether another media stream or another portion of the current media stream needs resource allocation adjustment. For example, resource allocation needs adjustment based on recent information (e.g., quality predictions). If adjustment is needed, then the method 900 returns to step 814. If adjustment is not needed, then the method 900 proceeds to step 816. At step 816, the method 800 ends.

Figure 9:
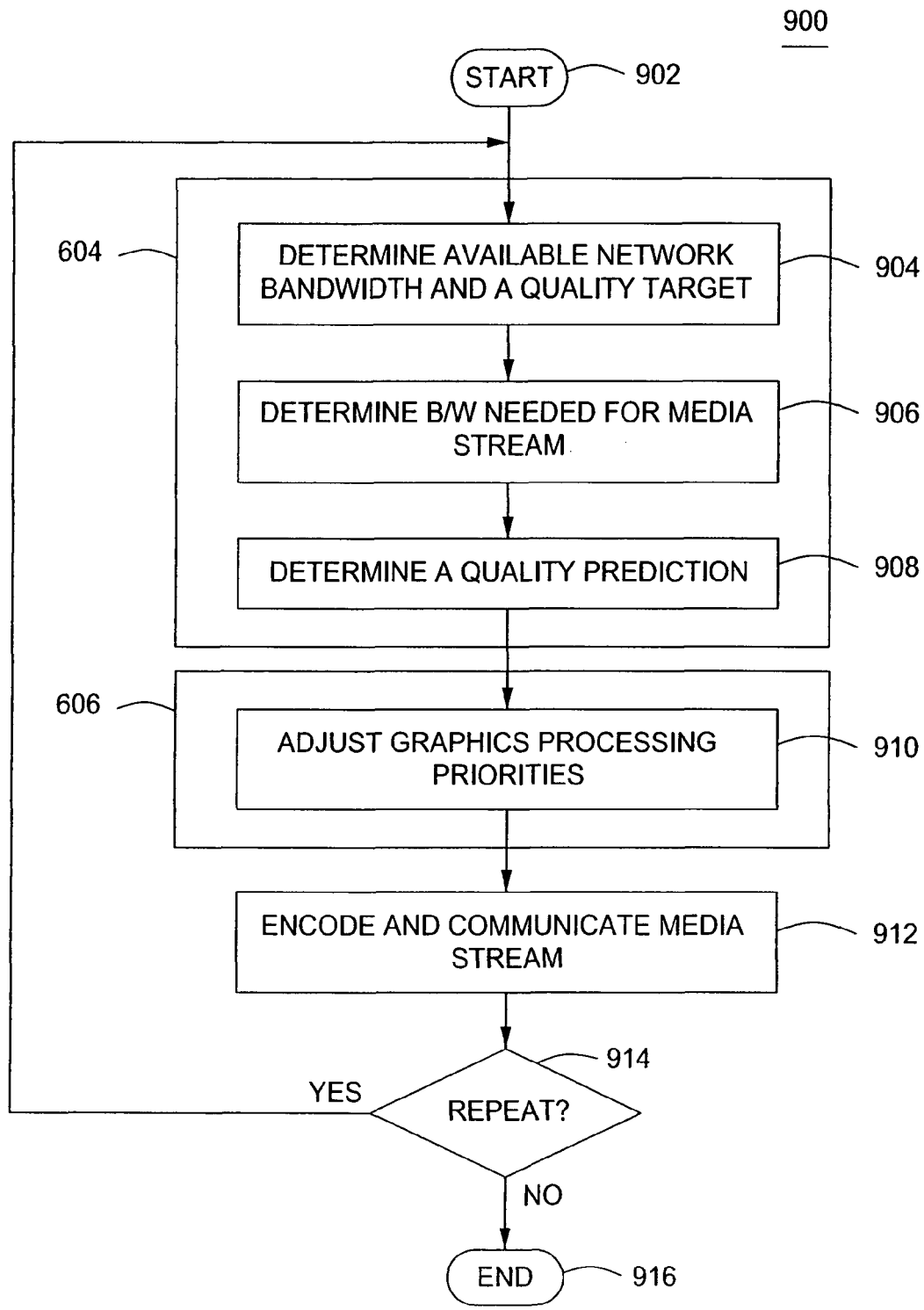
FIG. 9 is a flow diagram of an exemplary embodiment of a method of adjusting a graphics processing priority in accordance with one or more embodiments of the present invention.

FIG. 9 is a flow diagram of an exemplary embodiment of a method of adjusting graphics processing priorities in accordance with one or more embodiments of the present invention.

The method 900 begins at step 902 and proceeds to step 904. Steps 904 to 908 depict one or more embodiments of step 604 as illustrated in FIG. 6, as described above. At step 904, a network bandwidth capacity and a quality target of a media stream are determined. At step 906, an amount of network bandwidth needed to communicate the media stream is determined. At step 908, a quality prediction for encoding the media stream is determined.

At step 910, graphics processing priorities are adjusted based on a comparison result or difference between a quality prediction and a quality target of the media stream, as described above. A graphics processing priority may include a drawing priority, a processing order of graphics commands issued by a plurality of virtual machines, a user profile, a network bandwidth capacity, an interrupt, a proportional processing resource allocation as illustrated in FIG. 8 for the method 800 or any other priority indicator. In one embodiment, a peripheral device bridge 208, (as illustrated in FIG. 2) provides the other priority indicators. In another embodiment, the GPU 204 (as illustrated in FIG. 2) generates the media stream in accordance with the adjusted graphics processing priorities. The step 910 represents one embodiment of the step 606 as illustrated in FIG. 6. At step 912, the media stream is encoded and communicated to a remote computer (e.g., any of the remote computers 106 as illustrated in FIG. 1).

At step 914, a determination is made as to whether another media stream or another portion of the current media stream needs graphics processing priority adjustment. If graphics processing priority adjustment is needed, then the method 900 returns to step 904. If graphics processing priority adjustment is not needed, then the method 900 proceeds to step 916. At step 916, the method 900 ends.

While the foregoing is directed to embodiments of the present invention, other and further embodiments of the invention may be devised without departing from the basic scope thereof, and the scope thereof is determined by the claims that follow.

What is claimed is:

1. A method for controlling display image data generation, comprising:
    encoding, by a virtual machine of a plurality of virtual machines of a host computer, an update to a desktop image to generate an encoded update as part of communicating the update with a remote computer, wherein the desktop image is rendered by a processing resource of the host computer at an update rate that is dependent on an allocation of the processing resource to the virtual machine amongst a plurality of virtual machines sharing the processing resource;
    generating a quality prediction for a display, at the remote computer, of a decoding of the encoded update, wherein the quality prediction (a) is based on an analysis of the update and a constraint of a network used to communicate the encoded update to the remote computer, and (b) comprises a prediction of pixel updates that would be dropped when communicating future updates to the desktop image to the remote computer; and
    adjusting the allocation based on the quality prediction and a desired quality target.

2. The method of claim 1, wherein encoding the update is based on the desired quality target.

3. The method of claim 2, further comprising:
    comparing the quality prediction to the desired quality target to create a comparison result, wherein the allocation is adjusted based on the comparison result.

4. The method of claim 2, further comprising generating the desired quality target according to at least one of a characteristic of a communication channel coupling the virtual machine to the remote computer or a user profile, wherein the network comprises the communication channel.

5. The method of claim 2, wherein the step of generating the quality prediction is based on an attribute of an image representing a portion of the desktop image.

6. The method of claim 2, further comprising reducing a the allocation based on the quality prediction, wherein the quality prediction indicates a potential failure to communicate future updates to the desktop image.

7. The method of claim 2, wherein the step of adjusting the allocation further comprises adjusting the allocation based on at least one of an allocation history of the processing resource, a history of qualities for encoding, a resource allocation to the plurality of virtual machines, a duration requirement for the allocation, a time limitation requirement for the allocation, a sequencing requirement for the allocation, a requirement to synchronize the allocation with an event, or a requirement to synchronize the allocation with an another resource.

8. The method of claim 1, wherein the allocation is adjusted based on at least one of network bandwidth utilization information, central processing unit utilization information, graphics processor utilization information, or desktop image content information.

9. The method of claim 1, wherein the processing resource comprises at least one of a central processing unit resource, a memory resource, a file system resource or a graphics processor resource.

10. The method of claim 1 wherein the adjusting the allocation comprises scheduling the processing resource, the processing resource comprising at least one of a central processing unit of the host computer or a graphics processing unit of the host computer.

11. An apparatus for controlling display image data generation, comprising:
    a processor shared by a plurality of virtual machines, wherein a virtual machine in the plurality of virtual machines renders a desktop image at an update rate that is dependent on an allocation of the processor to the virtual machine amongst the plurality of virtual machines;
    an encoder, coupled to the processor, enabled to (i) generate an encoding of updates to the desktop image and (ii) generate a quality prediction for a display, at a remote computer, of a decoding of the encoding, wherein the quality prediction (a) is based on an analysis of the updates and a constraint of a network used to communicate the encoding to the remote computer, and (b) comprises a prediction of pixel updates that would be dropped when communicating future updates to the desktop image to the remote computer; and
    a memory comprising virtualization manager instructions executable by the processor to determine the allocation based on the quality prediction and a desired quality target.

12. The apparatus of claim 11, wherein the processor is at least one of a central processing unit or a graphics processing unit.

13. The apparatus of claim 11, wherein a virtualization manager schedules processing time of the at least one of the central processing unit or the graphics processing unit.

14. The apparatus of claim 13, wherein the virtualization manager instructions enable synchronizing processing time of the central processing unit and the graphics processing unit.

* * * * *